United States Patent [19]

Smith et al.

[11] Patent Number: 5,329,623
[45] Date of Patent: Jul. 12, 1994

[54] APPARATUS FOR PROVIDING CRYPTOGRAPHIC SUPPORT IN A NETWORK

[75] Inventors: Jonathan M. Smith, Philadelphia; C. Brendan S. Traw, Bensalem; David J. Farber, Landenberg, all of Pa.

[73] Assignee: The Trustees of the University of Pennsylvania, Philadelphia, Pa.

[21] Appl. No.: 152,085

[22] Filed: Nov. 12, 1993

Related U.S. Application Data

[63] Continuation of Ser. No. 900,163, Jun. 17, 1992.

[51] Int. Cl.$^5$ ............................................. G06F 15/02
[52] U.S. Cl. ..................................... 395/275; 395/200
[58] Field of Search ................... 395/200, 275; 380/4, 380/21, 23, 25, 29, 37, 42, 43, 44, 49; 364/222.5, 260.81, 918.7, 949.71

[56] References Cited

U.S. PATENT DOCUMENTS

| | | | |
|---|---|---|---|
| 4,975,906 | 12/1990 | Takiyasu et al. | 370/85.13 |
| 4,982,429 | 1/1991 | Takaragi et al. | 380/28 |
| 5,012,466 | 4/1991 | Buhrke et al. | 370/62 |
| 5,081,678 | 1/1992 | Kaufman et al. | 380/29 |
| 5,101,404 | 3/1992 | Kunimoto et al. | 370/60 |
| 5,130,984 | 7/1992 | Cisneros | 370/94.1 |
| 5,136,584 | 8/1992 | Hedlund | 370/94.1 |
| 5,144,622 | 9/1992 | Takiyasu et al. | 370/85.13 |
| 5,153,920 | 10/1992 | Danner | 380/48 |
| 5,214,698 | 5/1993 | Smith, Sr. et al. | 380/21 |
| 5,220,606 | 6/1993 | Greenberg | 380/43 |
| 5,253,294 | 10/1993 | Maurer | 380/21 |

OTHER PUBLICATIONS

Arnould et al., "The Design of Nectar: A Netwrok Backplane for Heterogeneous Multicomputers," Jan. (1989) CMU-DS-89-101.

Cooper et al., "Protocol Implementation on the Nectar Communication Processor," (1990).

H. B. Bakoglu et al., "RISC System/6000 Hardwared Overview".

David T. Greaves et al., "The Cambridge Backbone Ring," IEEE Infocom 90, Feb. 5, 1990.

Andy Hooper, "Pandora-An Experimental System for Multimedia Applications," University of Cambridge, pp. 1–16.

Israel Cidon et al., "PARIS: An Approach to Integrated High-Speed Private Networks," Int'l Journal of Digital and Analog Cabled Systems, vol. 1, 77–85 (1988).

(List continued on next page.)

*Primary Examiner*—Dale M. Shaw
*Assistant Examiner*—Moustafa Mohamed Meky
*Attorney, Agent, or Firm*—Woodcock Washburn Kurtz Mackiewicz & Norris

[57] ABSTRACT

A host interface comprising a reassembler for reassembling and decrypting data that has been encrypted in accordance with a pre-defined key and segmented into a plurality of asynchronous transfer mode (ATM) cells. Each cell comprises a virtual channel identifier (VCI), a multiplexing identifier (MID) if the data is transmitted using the CCITT specified Class 4 connectionless transfer ATM adaptation layer (AAL), and a cell body. The reassembler comprises a cell manager for separating each cell body from that cell body's corresponding VCI and MID (if present), a linked list manager for managing and storing linked list data indicative of addresses at which the cell bodies are to be stored, a content addressable memory (CAM) for managing and storing the VCIs (and MIDs for connectionless data) and providing pointers into the linked list data, a lookup controller for writing the VCIs to the CAM, a reassembly buffer for storing the cell bodies, and a decryption device for decrypting the data and writing the decrypted data to the reassembly buffer. The major subsections operate concurrently to form an ATM cell-processing pipeline. The interface may also comprise a segmenter for encrypting data received from a host computer and segmenting the encrypted data into a plurality of ATM cells.

10 Claims, 3 Drawing Sheets

OTHER PUBLICATIONS

Bruce S. Davie, "Host Interface Design for Experimental, Very High-Speed Networks," Bell Communications Research.

Anna Hac et al., "Synchronous Optical Network and Broadband ISDN Protocols," IEEE, Computer, 1989, pp. 26-33.

Martin Zitterbart, "High-Speed Transport Components," IEEE Network Magazine, Jan. 1991. 54-80.

H. Abu-Amara, et al., "PSi: A Silicon Computer For Very Fast Protocol Processing," Columbia University Computer Science Dept.

Advanced Micro Devices, AM99C10 256×48 Content Addressable Memory (CAM) Pub. No. 08125, Rev. C., Aug. 1988.

CHIPS 82C611, 82C612 Micro CHIPS: Micro Channel Interface Parts (1988).

Special Report "Gigabit Network Testbeds," IEEE, Sep. 1990, pp. 77-80.

Ruzena Bajcsy et al., "Gigabit Telemanufacturing: Applying Advanced Information Infrastructure," Abstract, Computer and Information Science, University of Pennsylvania.

AM99C10 256×48 Content Addressable Memory Pub. No. DE125.

EPM5128 Data Sheet; pp. 71-76.

EPM5032 Data Sheet; pp. 49-52.

Deep First-In First-Out (FIFO) 512×9 CMOS Memory Pub. No. 10175 (Aug. 1988).

VLSI Technology, Inc. Advance Information VM007, "Data Encryption Process" Mar. 1992, pp. 1-38.

U.S. application Ser. No. 07/708/775 filed May 28, 1991 to Smith et al.

APPARATUS FOR PROVIDING CRYPTOGRAPHIC SUPPORT IN A NETWORK

This is a continuation of application Ser. No. 07/900,163, filed Jun. 17, 1992.

FIELD OF THE INVENTION

The present invention generally relates to high-speed networks and more particularly relates to a high-performance host interface with cryptographic support. One preferred application of the present invention is in the host interface described in U.S. patent application Ser. No. 708,775, titled "High-Performance Host Interface For ATM Networks," filed May 28, 1991 now U.S. Pat. No. 5,274,768, Dec. 28, 1993, which is hereby incorporated by reference into this specification as if fully set forth herein.

BACKGROUND OF THE INVENTION

Network usage and capabilities are both increasing at high rates. For example, the traffic load on the National Science Foundation's NSFNET backbones in the United States doubles every few months. Much of this increased traffic is due to the increased connectivity provided by interconnection with other networks, large numbers of personal workstations connected to LANs, and large numbers of computers connected via 9600 bit per second (bps) dial-ins. Much of this traffic is traditional Internet (inter-network) traffic, e.g., electronic mail, netnews, and file transfer, although a significant percentage of traffic is due to remote terminal sessions via login and telnet.

Networks are improving in a number of ways. Bandwidth is the most important area in which improvement is taking place, as bandwidth can be used to achieve a variety of other quality-of-service goals. In the very near future, network technologies with bandwidths near 1 Gbps will be deployed in several areas of the United States. See "Gigabit Testbed Initiative Summary," Corporation for National Research Initiatives, 1985 Preston White Drive, Suite 100, Reston, Va. 22091 USA (January, 1992) info@nri.reston,va,us.

AURORA, for example, is an experimental wide area network testbed whose main objective is the exploration and evaluation of network technologies. The Gbps network will link four sites:

(1) Bellcore's Morristown Research and Engineering Laboratory in Morristown, N.J.;
(2) IBM Research's Computer Science Laboratory in Hawthorne, N.Y.;
(3) MIT's Laboratory for Computer Science in Cambridge, Mass.;
(4) University of Pennsylvania's Distributed Systems Laboratory in Philadelphia, Pa. The topology of AURORA is illustrated in FIG. 1.

Among the applications envisioned for gigabit per second networks (e.g., AURORA) are interactive teleconferencing, advanced multimedia systems with support for sensory data, and advanced displays with extremely high-quality imaging capabilities. Many of these applications would not be possible without large available bandwidths. Many more applications can be imagined, and it is expected that many may be commercialized.

Many proposed applications, however, will not be feasible without significant attention paid to the issue of security. Traditionally, security schemes relied on either administrative means (e.g., systems with extremely restricted access, careful monitoring and audits) or cryptographic support, or a combination of these techniques. Since networks, by their nature, require distributed control, cryptographic means have somewhat more utility than solely administrative means to achieve security. A detailed survey of cryptographic techniques is available in D. R. Denning, Cryptography and Data Security, Addison-Wesley (1982).

The major axes of choice are: choice of encryption algorithm, hardware or software implementation, and placement of cryptographic support in a networking architecture. Of the available cryptographic methods that have withstood significant attack, the Data Encryption Standard (DES) (described in NBS, Data Encryption Standard (FIPS Publication 46), National Bureau of Standards, U.S. Department of Commerce, Washington, DC (January, 1977)) and the Rivest-Shamir-Adleman (RSA) scheme (described in R. L. Rivest, A. Shamir, and L. Adleman, "A method of obtaining digital signatures and public-key cryptosystems," Communications of the ACM 21(2), pp. 120–126 (February 1978)) seem most attractive. Although the use of public-key technology offers many advantages, the poor performance of RSA implementations are a major problem. A recent survey of hardware implementations of the RSA algorithm indicates that the fastest available implementations are no faster than 1 Mbps. Significantly faster implementations of the private-key DES algorithm are available in hardware and architectural techniques for further improving its performance have been reported. See 1989 IC MASTER, Fact Sheet, Western Digital WDD20C03A, 1989; VLSI Technology, Inc. VM007 Data Encryption Processor: Advance Information Sheet, 8375 South River Parkway, October, 1991; and Albert G. Broscius, Hardware Analysis and Implementation of the NBS Data Encryption Standard, University of Pennsylvania, School of Engineering and Applied Sciences (April, 1991), MSE Thesis (CIS).

Many applications envisioned for ultra-high-speed networks require cryptographic transformations for data in transit. The need for security and privacy will drive transformations in workstation architectures, especially high-performance communications subsystems. There is a need for apparatus and methods for providing cost-effective and high-performance cryptographic support in high speed networks while sacrificing little in flexibility.

SUMMARY OF THE INVENTION

Accordingly, a primary object of the present invention is to provide a high speed (e.g., gigabit per second) network with cryptographic support. As described below, according to a presently preferred embodiment of the invention, cryptographic support apparatus is combined with the host/network interface.

According to the present invention, an interface for coupling a host computer to a high-speed telecommunications network comprises reassembler means for reassembling and decrypting data that has been encrypted in accordance with a pre-defined key and segmented into a plurality of asynchronous transfer mode (ATM) cells, where each cell preferably comprises a virtual channel identifier (VCI), a multiplexing identifier (MID) (if the data is transmitted using the CCITT specified Class 4 connectionless transfer ATM adaptation layer (AAL)), and a cell body. In preferred embodiments of the invention, the reassembler means comprises cell manager means for separating each cell body from that cell body's corresponding VCI (and MID if present), linked list manager means for storing linked list data indicative of addresses at which said cell bodies are to be stored, content addressable memory (CAM) means for storing said VCIs (and MIDs) and providing pointers into said linked list data, lookup controller means for writing said VCIs (and MIDs) to said CAM means, reassembly buffer means for storing said cell bodies, and decryption means for decrypting said data in accordance with said key and writing the decrypted data to said reassembly buffer means. One preferred embodiment of the invention further comprises segmenter means for encrypting data received from a host computer and segmenting the encrypted data into a plurality of ATM cells.

The present invention also encompasses host interfaces comprising means for providing private keys for each of a plurality of virtual circuits, means for providing real-time agile keying across said virtual circuits, means for providing concurrent cleartext and ciphertext streams, means for providing application-specific control of cryptographic keying, and means for providing cleartext headers and ciphertext payloads. Other features of the present invention are described below.

DETAILED DESCRIPTION OF PREFERRED EMBODIMENTS

Figure 1:
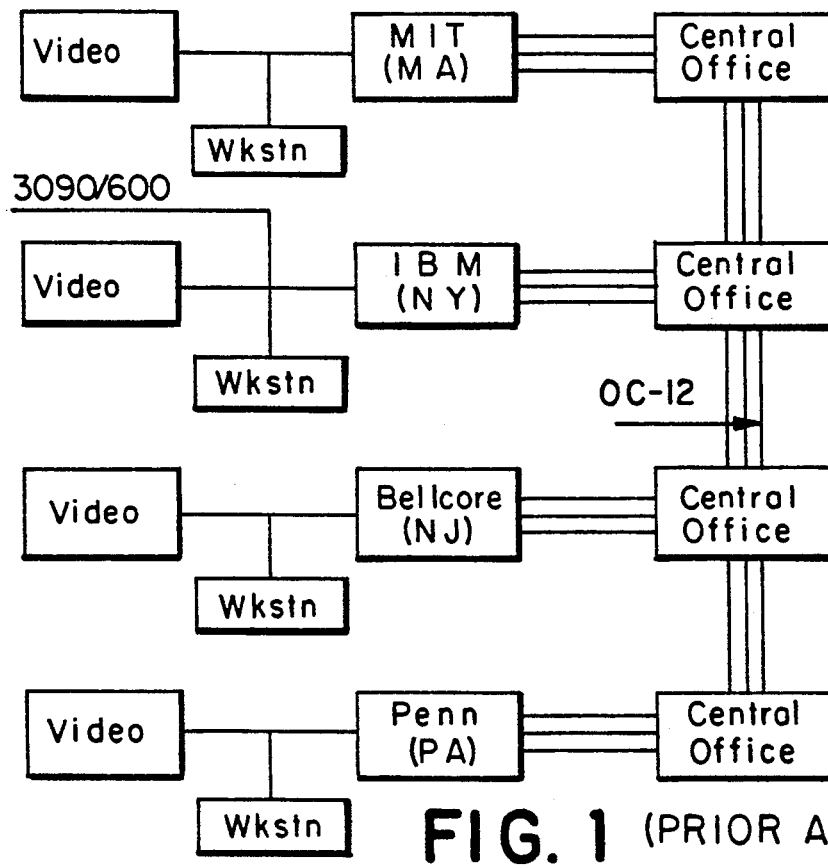
FIG. 1 is a block diagram of the AURORA network topology.

The Data Encryption Standard (DES) is the most widely used publicly available secret-key algorithm. Since its introduction, DES implementations have improved in achieving high encryption rates. Computer data communications rates have also increased, and today's high-performance computer networks further increase the encryption bandwidth needed to avoid performance bottlenecks in systems requiring security. Architectural means to increase DES throughput have been studied by the present inventors, with the intent of producing a DES implementation to satisfy these bandwidth demands.

A key idea underlying the present invention is the use of the physical parallelism possible in a hardware realization to improve performance without resorting to exotic technologies. As described below, a useful system can be implemented when such parallelism can be cheaply exploited using architectural innovations. A cryptographic subsystem was analyzed as a series of levels, ranging from the basic combinational logic of a single level to the use of overlapped operation of the host processor and the cryptographic subsystem. The DES is implemented as sixteen "rounds" of key-directed encipherment; each round implements permutations and substitutions on the 64-bit input using the 56 bits of key for selection of the particular transformation. The 64 bits of output of a round are fed back as input for the next round until sixteen rounds are achieved, at which point the 64 bits are output.

At the combinational logic level, where a single round is implemented, the algorithm can be split into several parallel computations for increased speed. By generating subkeys one cycle in advance, the time required can be effectively overlapped with the use of the subkey in the rest of the round operation. An additional overlap can be made of the two stages of exclusive-or (XOR) gates at the expense of increased complexity and gatecount.

Use of multiple round implementations can increase computation bandwidth if the DES mode of operation chosen does not require feedback of ciphertext (see National Bureau of Standards, Federal Information Processing Standard #81: Operational Modes of the DES), ruling out all but the Electronic Code Book (ECB) method. Unfortunately, the ECB method is known to be susceptible to plaintext frequency-analysis based attacks, since identical input blocks result in identical output blocks. A proposed operating method resists this attack yet does not require feedback of ciphertext. See Anthony McAuley and David C. Feldmeier, Minimizing Protocol Ordering Constraints to Improve Performance, available via anonymous ftp from Internet host thumper.bellcore.com, 1991.

At the board level, concurrent I/O processing and DES computation provides for steady-state operation of the encryption unit. This can be accomplished using double-buffering and a small amount of extra logic. In addition to this buffering, the use of Direct Memory Access (DMA) for the encryption board allows the host processor to continue other work concurrently with whatever the encryption unit is achieving.

Figure 2:
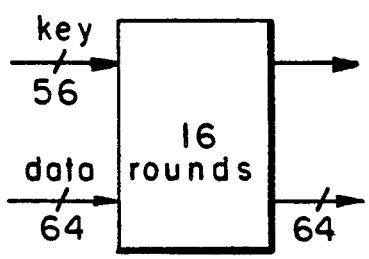
FIG. 2 depicts a single unit, sixteen round DES block.

Computation elements may be configured to implement a fraction of the rounds in a pipeline-like approach. The main idea is the conversion of the iterative "rounds" of DES into a pipeline-like stream processing structure, analogous to hardware "loop unrolling." This can be accomplished by tagging each 64-bit input with the 56-bit key with which it undergoes the single-round transformation; a round can effectively be thought of as a 120-bit wide piece of combinational logic. A single-board implementation of the DES requires that the sixteen prescribed rounds of DES be performed on the 64-bit data input and 56-bit key input before it is presented as output. The sixteen rounds mean that sixteen passes through the internal data path of any implementation be performed. Such a situation is illustrated in FIG. 2.

Figure 3:
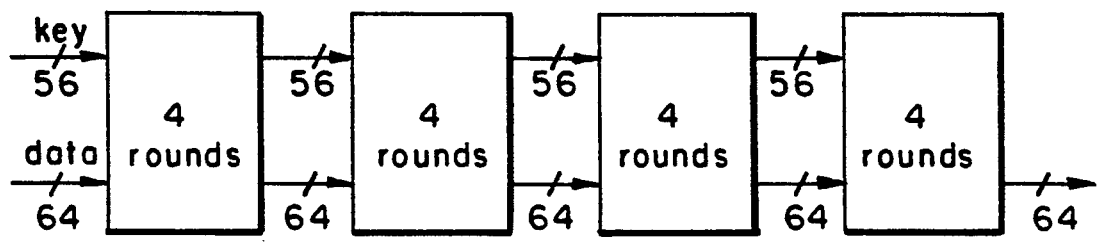
FIG. 3 illustrates the expansion of the single-unit DES block of FIG. 2 into four DES units, with four rounds per unit.

However, if one employs multiple boards, for example four, as illustrated in FIG. 3, one can reduce the number of rounds performed by each board. There is a small increase in the logic for managing the keying, but this is a second-order effect as far as performance is concerned. The primary relationship is this: with up to a maximum of sixteen DES units (one per round), there is a linear cost/performance tradeoff achievable by (1) doubling the number of DES units, and (2) halving the number of rounds each unit performs. For example, FIG. 3 shows four units each performing four rounds. The upper limit is sixteen units, each performing one round.

Ignoring second order effects, the major delay is induced by a round. Thus, as each "expansion" takes place the unit count is doubled and the round count is halved, meaning that the delay for the first bit through the sixteen unit case is almost exactly the same as the delay for the first bit through the single unit case.

When keying needs to be frequently updated, the pipeline style allows a matching of the datapath flow with a parallel keypath. In this way, each data block is accompanied by its key throughout the computation. Switching keys between successive data blocks without flushing the pipeline is possible because the key and data streams are synchronized.

For infrequent key changes, the tradeoff in keying interconnection may not be worthwhile as compared to maintaining separate key registers for each stage of the pipeline. Each round would then maintain its own key load (shadow) register in this approach. The standard key shifting sequence would be partially executed on each stage. Since a partial execution of the key schedule would not result in a complete cycling of the keytext, the key would be reloaded from the shadow register when it has completed its share of the computation on a data block.

A limitation of the pipeline approach is the bandwidth ceiling imposed by the number of rounds in the algorithm (sixteen). This means that a single pipeline of processors cannot provide more than sixteen times the encryption bandwidth of a single processor. Additionally, the pipeline suffers in scalability since the number of stages must be a factor of sixteen. This disadvantage is more notable when considering an upgrade of a pipeline: to gain any increase in bandwidth requires a doubling in computation resources. DMA support decouples the host processor from the encryption function to allow CPU processing of other tasks to proceed in parallel with the encryption request. See David P. Anderson and P. Venkat Rangan, "High-Performance Interface Architectures for Cryptographic Hardware," EURO-CRYPT '87 Proceedings, Springer-Verlag, Amsterdam (1987).

A DES board using SSI TTL and MSI PALs employing the MUX key register approach has been developed. See Albert G. Broscius and Jonathan M. Smith, "Exploiting Parallelism in Hardware Implementation of the DES," Proceedings, CRYPTO 1991 Conference, Santa Barbara, Calif. (August, 1991). Testing of a wire-wrapped prototype with a single algorithm kernel indicated an encryption rate of 93 Mbps. An interface to the Micro Channel Architecture (MCA) bus of the IBM RISC System/6000 was also implemented. This implementation reveals a great deal about the internal structure of the DES hardware itself. Unfortunately, the parts cost of the implementation, potential performance limitations due to packaging, and the large amount of handwork required to replicate the work inhibited its use. In addition, concurrently with the completion of the work, very high-speed DES chips were made commercially available. See VLSI Technology, Inc. VM007 Data Encryption Processor: Advance Information Sheet.

Experience with the wire-wrapped board indicates that high encryption speeds are possible, and that architectural solutions can provide considerable leverage, independent of technology choices for the electronics. VLSI Technology's VM007 encryption chips were chosen as the basis for a Micro Channel Architecture bus card in one embodiment of the present invention. The chip has a number of important features, most notably the fact that it can be clocked at 30 Mhz, yielding Electronic Code Book (ECB) and Cipher Block Chaining (CBC) speeds of 192 Mpbs. This is entirely adequate for the current generation host interfaces, which typically operate at OC-3c speeds (155 Mbps). A key can be loaded in 8 clock cycles, or about 0.3 microseconds. Several registers for keying are provided.

A Micro Channel Architecture board has been implemented and tested, and software support has been written. It operates at rated speed, which exceeds the maximum transfer rate (130 Mbps) possible between the host and Micro Channel Architecture devices with current generation Micro Channel Architecture I/O Channel Controllers.

Figure 4:
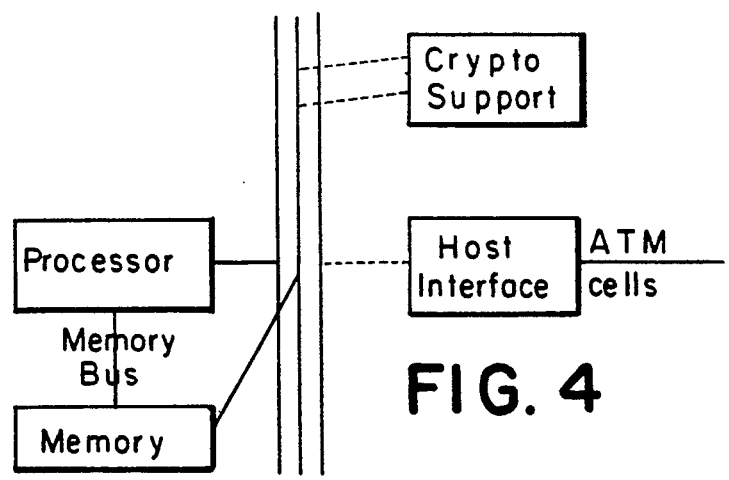
FIG. 4 depicts a network architecture employing bus-connected cryptographic support.

The major difficulty with this approach is the number of bus transactions necessary to move data to and from the network interface. This represents a serious performance limitation due more to the latency involved in roundtrips than in the bus throughput. Alternatives to this approach are described below. The nature of the traffic is illustrated in FIG. 4.

The prototypes discussed above indicate that a truly high-performance encryption subsystem should preferably be incorporated into the host/network interface.

A prototype ATM host interface for the IBM RISC system/6000 has been designed and implemented. See C. Brendan S Traw and Jonathan M. Smith, "A High-Performance Host Interface for ATM Networks," in Proceedings, SIGCOMM 1991, Zurich, SWITZERLAND (Sep. 4-6, 1991), pp. 317-325. The host interface is implemented as a pair of Micro Channel Architecture boards. See IBM Corporation, IBM RISC System/6000 POWERstation and POWERserver: Hardware Technical Reference, Micro Channel Architecture, IBM Order Number SA23-2647 00, 1990. The Segmenter converts data objects, such as IP packets, to ATM cells. These cells are then sent over the network. ATM cells include 48 bytes of data and five bytes of header, so that a reasonably sized data object (e.g., 8192 bytes) on the machine requires many ATM cells to be put on the network medium. The Reassembler takes ATM cells from the network and re-aggregates them into data objects.

Among the functions the Segmenter and Reassembler perform are the computation of CRC checksums, multiplexing and demultiplexing of virtual circuits, and a small amount (128 Kbytes) of buffering. The model for the host interface's role in a system is this: the host software makes any control decisions, while the host interface performs cellification, decellification, and any data movement to and from the host. This significantly reduces the burden on the workstation, as it is organized for data processing, not memory manipulation.

Figure 5:
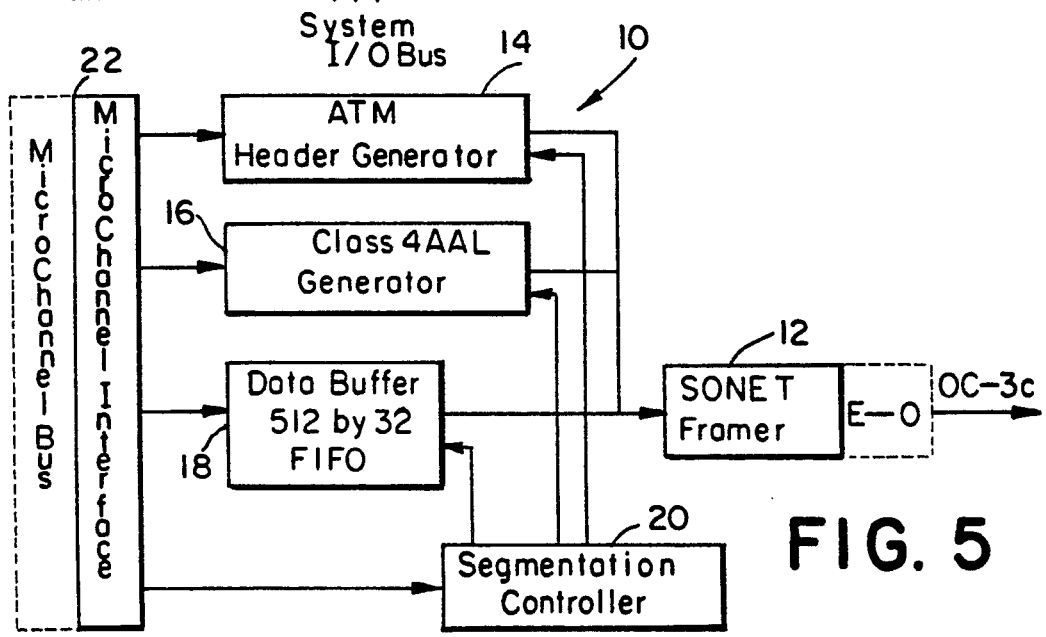
FIG. 5 is a block diagram of a Segmenter of a host interface.

A block diagram of a Segmenter 10 is presented in FIG. 5. The block diagram illustrates the Segmenter 10, comprising a SONET (synchronous optical network) framer 12, ATM header generator 14, ATM adaptation layer (AAL) generator 16, FIFO data buffer 18 and segmentation controller 20, coupled to a Micro Channel interface/bus 22. When data is to be transmitted into the network, the virtual circuit identifier (VCI) to be used is loaded into the ATM header generator 14. A multiplexing identifier (MID) is loaded into the AAL generator 16 if the data is to be transmitted via the Class 4 ATM adaption layer (AL4). See CCITT Recommendation I.363, B-ISDN ATM Adaptation Layer (AAL) Specification, 1990. The host then sets up a streaming mode (an optimized bus transfer mode for contiguous data) transfer to move the data which is to be transmitted from a pinned buffer in host memory (not shown) via the Micro Channel interface/bus 22 to the FIFO buffer 18. See IBM Corporation, IBM RISC system/6000 POWERStation and POWERserver: Hardware Technical Reference, General Information Manual, IBM Order Number SA23-2643-00, 1990. The location and size of the host's buffer are specified during stream set-up. While this transfer is being made, the Segmenter 10 produces the header check CRC and formats the control information into the appropriate ATM and AAL4 header formats. As soon as sufficient data has been placed into the FIFO buffer, the segmentation controller 20 removes the data for the first cell from the FIFO buffer 18 and adds an ATM header, AAL4 header and AAL4 trailer. If the cell is carrying AAL4 data, the payload CRC is calculated as the data is moved to the SONET framer 12 and placed in the appropriate field at the end of the cell. See Thomas J. Robe and Kenneth A. Walsh, "A SONET STS-3c User-Network Interface IC," in Proceedings, Custom Integrated Circuits Conference, San Diego, Calif. (May, 1991). This process is repeated until the FIFO buffer is drained.

Figure 6:
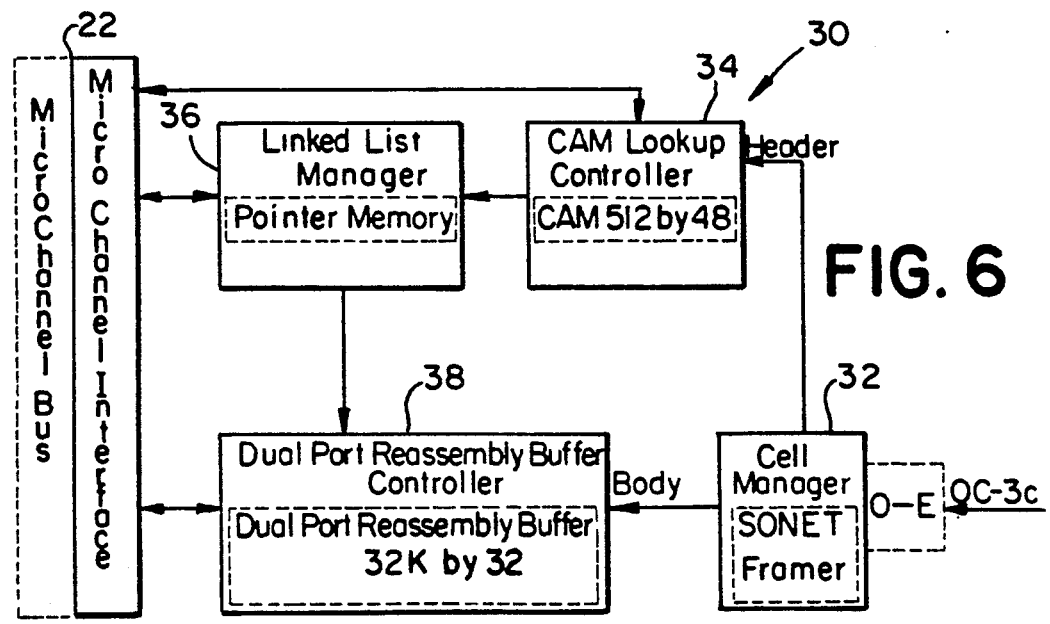
FIG. 6 is a block diagram of a Reassembler of a host interface.

A Reassembler 30 is illustrated in FIG. 6. The Reassembler 30 includes a cell manager 32, content addressable memory (CAM) lookup controller 34, linker list manager (LLM) 36 and dual port reassembly buffer (DPRB) 38. These four major subsections operate concurrently. The cell manager 32, CAM lookup controller 34, dual port reassembly buffer 38 and linked list manager 36 exploit this concurrency to form an ATM cell-processing "pipeline."

The cell manager 34 verifies the integrity of the header and payload (if the cell is carrying AAL4 data) of cells received from the network by the SONET framer. It extracts the VCI from the ATM header and the MID and length from the AAL header. The body of the cell is placed in a FIFO buffer (not shown) for later movement into the dual port reassembly buffer 38.

The CAM lookup controller 34 manages two CAMs that provide lookup support for a total of 256 simultaneous virtual connections and the reassembly of 246 datagrams (a datagram is a finite length packet with sufficient information to be routed from source to destination independently of previous transmissions). The host (not shown) is able to flush undesired virtual circuits and datagrams from the reassembler through the CAM lookup controller.

A reference resulting from the CAM lookup operation is passed to the LLM 36. The LLM, as its name suggests, establishes and maintains a linked list data structure for each of the virtual circuit and datagrams that is being received. Data received from the network is placed at the end of the appropriate list while data destined for host memory is read from the front of the list.

The LLM 36 allocates space in the DPRB for data coming into the Reassembler 30 from the network and passes the location to the DPRB controller 38. The cell body placed into the FIFO (not shown) by the cell manager 32 is removed and written into the appropriate reassembly buffer inside the DPRB controller 38.

The host (not shown) is able to read data from a particular virtual circuit or datagram by specifying a list reference to the LLM 36 that determines the location in the DPRB where data is stored. The location is passed to the DPRB controller 38 and the DPRB controller removes the data from the buffer for transfer into host memory (not shown) over the Micro Channel bus.

Performance of the above-described architecture is quite good. Measurements indicate that the system can send and receive at about 130 Mbps. Detailed performance data is available. See C. Brendan S. Traw and Jonathan M. Smith, "Implementation and Performance of an ATM Host Interface for Workstations," in Proceedings, IEEE Workshop on the Architecture and Implementation of High-Performance Communications Subsystems (HPCS '92), Tuscon, Ariz. (Feb. 17–19, 1992).

There are essentially two ways in which encryption hardware can be employed. One method is to make the encryption card generally available for access on the Micro Channel bus, as described above. This has the advantage that any application can employ the encryption hardware, for example, to encrypt and decrypt data written to disk, or to provide application-to-application cryptographic support. However, this approach, as illustrated in FIG. 4, suffers from the need to access the bus multiple times for each network transaction; e.g., data must cross the bus to be encrypted, cross the bus after encryption and, if the post-encryption transfer is to system memory, a third transfer into the host interface is required (although this is not strictly necessary on the Micro Channel Architecture as it supports card-to-card transfers). Since the considerable bus activity will severely inhibit network performance, this method is somewhat undesirable.

The other alternative is to incorporate the cryptographic hardware into the host/network interface. This is often used when link encryption is desired, but has the drawback that the cryptographic hardware is private to the interface. In addition, link encryption itself has several drawbacks. First, it provides little control for applications, e.g., for customized key choices. Second, it makes key management for arbitrary host-to-host encryption in a switched network difficult; packet-switching exacerbates this problem since headers are encrypted and must be readable if used for routing. A solution that combines some of the flexibility of the separate card architectures with the high-performance characteristics of a link-encryption solution is described below.

As shown in FIGS. 5 and 6, both the Segmenter and Reassembler portion of the host interface are broken into several functional blocks, which operate concurrently. This hardware concurrency permits high-performance solutions using inexpensive technology. The Reassembler, in particular, makes great use of concurrency by setting up a pipeline that has four logical stages. Preferred architectures are illustrated in FIGS. 7 and 8.

Figure 7:
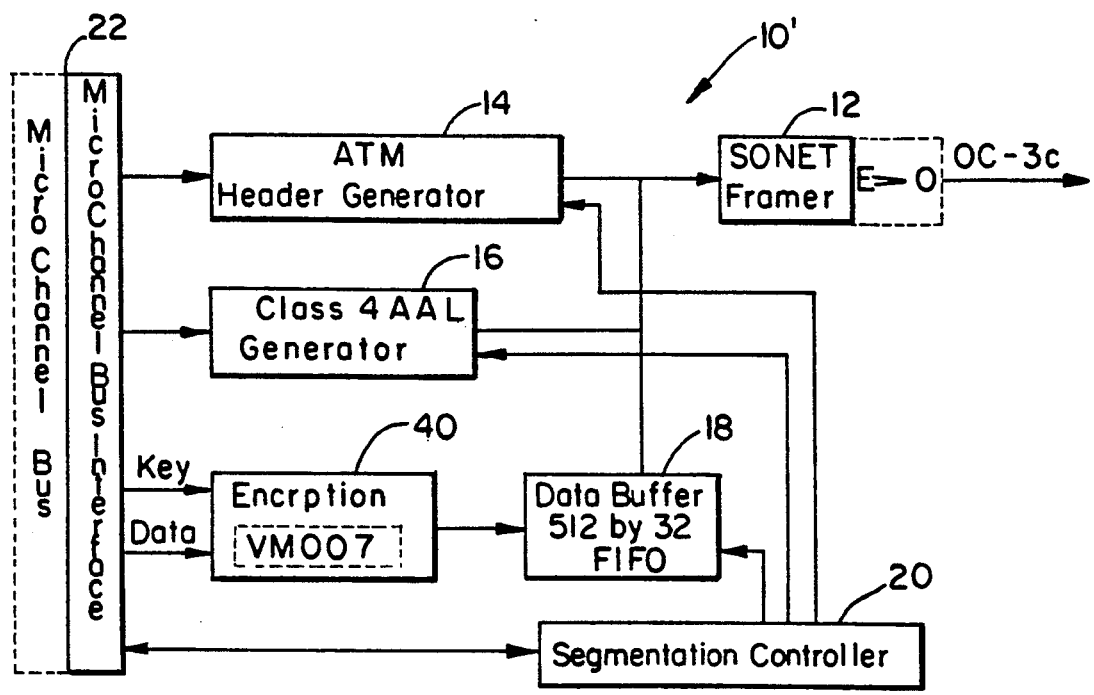
FIG. 7 is a block diagram of a Segmenter modified in accordance with the present invention to include support for encryption.
Figure 8:
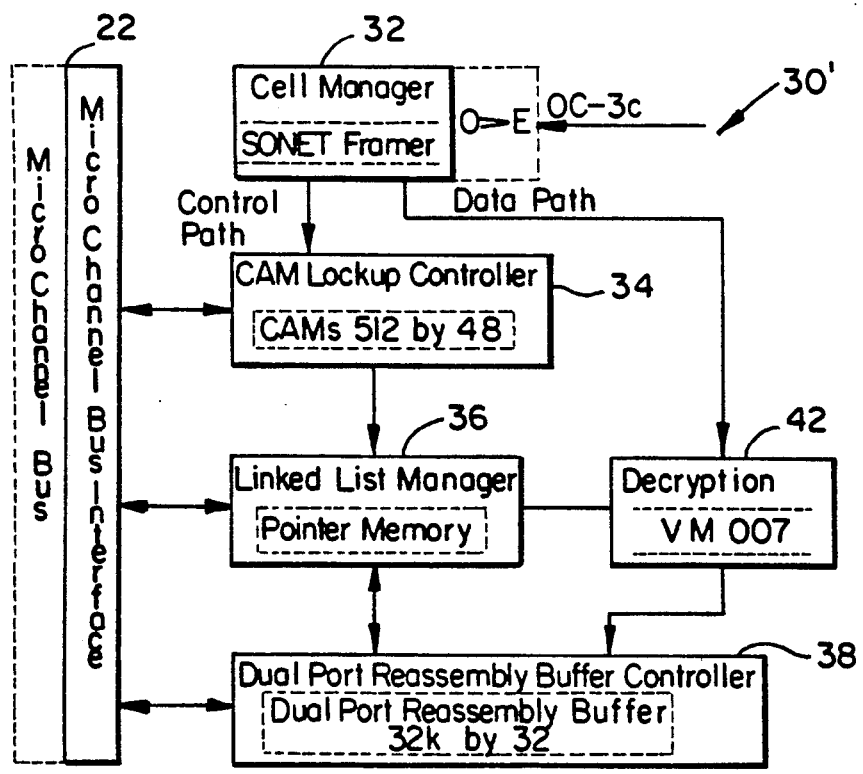
FIG. 8 is a block diagram of a Reassembler modified in accordance with the present invention to include support for decryption.

FIG. 7 is a block diagram of a Segmenter 10' modified in accordance with the present invention to include support for encryption. This support is provided by an encryption unit 40, which may comprise a VM007 data encryption processor. FIG. 8 is a block diagram of a Reassembler 30' modified to include support for decryption. Decryption support is provided by a decryption unit 42, which may also employ the VM007 processor. Blocks 40 and 42 contain logic circuitry for controlling key latching and loading. Logic circuitry of this type will be known to those skilled in the art after reading this specification, therefore a detailed description is unnecessary.

The addition of the encryption/decryption chip 40, 42 in each case serves to add another functional block that can operate concurrently with the other blocks. Key lookup is done by adding an extra field to the "head-of-list" data structure in the pointer memory. These "head-of-list" structures are located using the CAM with the Virtual-Circuit Identifier as a tag. The cryptographic keys are loaded into the VM007 in parallel with data movement from the cell manager's data buffer into the dual port reassembly buffer. This solution provides the following significant advantages:

1. Private keys for each virtual circuit (256 Virtual Circuits are currently supported in the host interface).
2. Real-time "agile" keying across Virtual Circuits.
3. Concurrent cleartext and ciphertext streams.
4. Application-specific control of cryptographic keying.
5. Cleartext headers and ciphertext payloads (which ease transport through packet-switched fabrics).

Unless workstation architectures change greatly, cryptographic hardware can advantageously be incorporated into the host/network interface. This adds a marginal amount of complexity to the interface and comfortably meshes with functions the interface already performs, such as cellification, decellification, and computing checksums. The advantages to this approach stem from the fact that neither host memory access nor bus transactions are required beyond those transactions necessary to move data from the application data areas to the host/network interface. Key management is closely correlated with ATM header manipulation, and can be efficiently performed with the addition of a small amount of logic in the host interface.

While the DES algorithm is used in preferred embodiments to prototype experimental solutions, the architectural proposals described herein are not dependent on its use. These architectural solutions relate to the placement of cryptographic hardware in a workstation connected to a high-bandwidth network. These solutions do not stand in the way of application-to-application ("end-to-end") privacy, under the assumption that the workstation operating system is a "trusted" subsystem. Distinct keys can be loaded for each ATM virtual circuit (i.e., each application).

What is claimed:

1. An interface for coupling a host computer to a high-speed telecommunications network, comprising reassembler means for reassembling and decrypting data that has been encrypted in accordance with a pre-defined key and segmented into a plurality of asynchronous transfer mode (ATM) cells, each cell comprising a virtual channel identifier (VCI) and a cell body, said reassembler means comprising:
   (a) cell manager means for separating each cell body from that cell body's corresponding VCI;
   (b) linked list manager means for storing linked list data indicative of addresses at which said cell bodies are to be stored;
   (c) content addressable memory (CAM) means for storing said VICs and providing pointers into said linked list data;
   (d) lookup controller means, operatively coupled to said cell manager means, said linked list manager means, and said CAM means, for writing said VCIs to said CAM means;
   (e) reassembly buffer means, operatively coupled to said linked list manager means, for storing said cell bodies; and
   (f) decryption means, operatively coupled to said cell manager means, said linked list manager means, and said reassembly buffer means, for decrypting said data in accordance with said key and writing the decrypted data to said reassembly buffer means.

2. An interface as recited in claim 1, further comprising segmenter means for encrypting data received from a host computer and segmenting the encrypted data into a plurality of ATM cells.

3. An interface as recited in claim 1, wherein said interface performs the following functions
   providing a private key for each of a plurality of virtual channels;
   providing real-time agile keying across said virtual channels;
   providing concurrent cleartext and ciphertext streams;
   providing application-specific control of cryptographic keying; and
   providing cleartext headers and ciphertext payloads.

4. An interface for coupling a host computer to a high-speed telecommunications network, comprising a reassembler for reassembling and decrypting data that has been encrypted in accordance with a pre-defined key and segmented into a plurality of asynchronous transfer mode (ATM) cells, each cell comprising a virtual channel identifier (VCI) and a cell body, said reassembler comprising:
   (a) a cell manager for separating each cell body from that cell body's corresponding VCI;
   (b) a linked list manager for storing linked list data indicative of addresses at which said cell bodies are to be stored;
   (c) a content addressable memory (CAM) for storing said VCIs and providing pointers into said linked list data;
   (d) a lookup controller for writing said VCIs to said CAM, said lookup controller being operatively coupled to said cell manager, linked list manager, and CAM;
   (e) a reassembly buffer for storing said cell bodies, said reassembly buffer being operatively coupled to said linked list manager; and
   (f) a decryption circuit, operatively coupled to said cell manager, said linked list manager, and said reassembly buffer, for decryption said data in accordance with said key;
   wherein said cell manager, linked list manager, CAM, lookup controller, reassembly buffer, and decryption circuit operate concurrently with one another.

5. An interface as recited in claim 4, further comprising a segmenter for encrypting data received from a host computer and segmenting the encrypted data into a plurality of ATM cells.

6. An interface as recited in claim 4, wherein said interface performs the following functions:
   providing a private key for each of a plurality of virtual channels;
   providing real-time keying across said virtual channels:
   providing concurrent cleartext and ciphertext streams;

providing application-specific control of cryptographic keying; and providing cleartext headers and ciphertext payloads.

7. A reassembler, for use in an interface between a host computer and a high-speed telecommunications network, for reassembling and decrypting data that has been encrypted in accordance with a pre-defined key and segmented into a plurality of cells each of which comprises at least a virtual channel identifier (VCI) and a cell body, comprising:

(a) first means for separating each cell body from its corresponding VCI and determining respective linked list reference addresses for the VCIs;

(b) a decryption circuit for receiving cell bodies from said first means and decrypting said cell bodies in accordance with said key;

(c) a first data path coupling said first means to said decryption circuit;

(d) a reassembly buffer for storing said cell bodies after said cell bodies have been decrypted;

(e) a second data path coupling said decryption circuit to said reassembly buffer; and (f) linked list manager for receiving said key from said host device and providing said key to said decryption circuit in parallel with movement of said cell bodies from said first means to said decryption circuit, and for storing linked list data indicative of addresses at which the decrypted cell bodies are stored in said reassembly buffer.

8. A reassembler as recited in claim 7, wherein said first means comprises:

(i) a cell manager for separating each cell body from its corresponding (ii) a content addressable memory (CAM) for storing said VCIs and providing pointers into said linked list data; and (iii) a look-up controller for writing said VCIs to said CAM.

9. A reassembler as recited in claim 7, comprising means for performing the following functions:

providing a private key for each of a plurality of virtual channels;

providing real-time keying across said virtual channels;

providing concurrent cleartext and ciphertext streams;

providing application-specific control of cryptographic keying; and providing cleartext headers and ciphertext payloads.

10. A method of operating an interface between a host computer and a high-speed telecommunications network, for use in reassembling and decrypting data that has been encrypted in accordance with a pre-defined key and segmented into a plurality of cells each of which comprises at least a virtual channel identifier (VCI) and a cell body, comprising the steps of:

(a) separating each cell body from its corresponding VCI and determining respective linked list reference addresses for the VCIs;

(b) receiving said key from said host device;

(c) providing said cell bodies and said key in parallel to said decryption circuit;

(d) decrypting said cell bodies in accordance with said key;

(e) storing the decrypted cell bodies in a buffer; and (f) storing linked list data indicative of addresses at which the decrypted cell bodies are stored in said reassembly buffer.

* * * * *

UNITED STATES PATENT AND TRADEMARK OFFICE
CERTIFICATE OF CORRECTION

PATENT NO. : 5,329,623
DATED : July 12, 1994
INVENTOR(S) : Jonathan M. Smith, C. Brendan S. Traw and David J. Farber It is certified that error appears in the above-indentified patent and that said Letters Patent is hereby corrected as shown below:

Column 6, Line 32 - after the "S" in C. Brendan S Traw, insert a period ".".

Column 9, Line 50 - the word "is" should appear after "claimed".

Column 10, Line 16 - after "functions" insert a semi-colon ":".

Column 11, Line 25 - after "(f)" insert "a".

Column 11, Line 36 - after "corresponding" insert "VCI;".

Signed and Sealed this

Twenty-ninth Day of August, 1995

Attest:

BRUCE LEHMAN

Attesting Officer     Commissioner of Patents and Trademarks